United States Patent
Zhou et al.

(10) Patent No.: US 10,521,487 B2
(45) Date of Patent: *Dec. 31, 2019

(54) METHODS AND APPARATUS FOR MDT LOG REPORTING IN A MOBILE COMMUNICATION NETWORK

(75) Inventors: Wei Hua Zhou, Beijing (CN); Yi Zhang, Beijing (CN); Malgorzata Tomala, Nowe Miasto nad Pilica (PL)

(73) Assignee: Nokia Solutions and Networks Oy, Espoo (FI)

( * ) Notice: Subject to any disclaimer, the term of this patent is extended or adjusted under 35 U.S.C. 154(b) by 1179 days.

This patent is subject to a terminal disclaimer.

(21) Appl. No.: 13/805,366

(22) PCT Filed: Jun. 21, 2010

(86) PCT No.: PCT/CN2010/074128
§ 371 (c)(1),
(2), (4) Date: Feb. 5, 2013

(87) PCT Pub. No.: WO2011/160274
PCT Pub. Date: Dec. 29, 2011

(65) Prior Publication Data
US 2013/0144551 A1 Jun. 6, 2013

(51) Int. Cl.
*G06F 17/00* (2019.01)
*H04W 24/10* (2009.01)
(Continued)

(52) U.S. Cl.
CPC ............ *G06F 17/00* (2013.01); *H04W 24/10* (2013.01); *H04W 24/08* (2013.01); *H04W 76/27* (2018.02)

(58) Field of Classification Search
CPC ..... H04W 24/00; H04W 24/08; H04W 28/00; H04W 28/02; H04W 28/0221;
(Continued)

(56) References Cited

U.S. PATENT DOCUMENTS

| 8,594,657 B2 | 11/2013 | Wu | 455/423 |
| 9,226,187 B2 | 12/2015 | Wu | 455/436 |

(Continued)

FOREIGN PATENT DOCUMENTS

| CN | 1973454 A | 5/2007 |
| CN | 1988454 A | 6/2007 |

(Continued)

OTHER PUBLICATIONS

Lee et al, U.S. Provisional Application, Jun. 17, 2010.*
(Continued)

*Primary Examiner* — Mischita L Henson
*Assistant Examiner* — Lynda Dinh
(74) *Attorney, Agent, or Firm* — Harrington & Smith

(57) ABSTRACT

A method including causing a plurality of measurements to be performed by a user equipment to provide measurement information; causing a message to be sent from the user equipment to a network element indicating that measurement information is available; and responsive to a message from said network element requesting said measurement information, causing a response to be sent from the user equipment to said network with only some of said measurement information and information indicating that further measurement information is available.

22 Claims, 4 Drawing Sheets

(51) Int. Cl.
*H04W 24/08* (2009.01)
*H04W 76/27* (2018.01)

(58) Field of Classification Search
CPC ......... H04W 28/0215; H04W 28/0226; H04W 28/0231; H04W 28/0247; H04W 24/10; H04W 76/046; H04W 76/27; G06F 17/00
USPC ........................................................ 702/122
See application file for complete search history.

(56) References Cited

U.S. PATENT DOCUMENTS

| | | |
|---|---|---|
| 2005/0251363 A1 | 11/2005 | Turner et al. |
| 2006/0148411 A1 | 7/2006 | Cho et al. |
| 2006/0165188 A1 | 7/2006 | Wunder et al. |
| 2009/0201825 A1 | 8/2009 | Shen et al. |
| 2009/0296637 A1 | 12/2009 | Fischer |
| 2011/0195668 A1* | 8/2011 | Lee ................. H04W 24/10 455/67.11 |
| 2011/0250880 A1* | 10/2011 | Olsson ............. H04W 76/027 455/423 |
| 2011/0306345 A1 | 12/2011 | Wu ........................ 455/436 |
| 2011/0312306 A1* | 12/2011 | Wu .................. H04W 24/10 455/414.1 |
| 2012/0088457 A1* | 4/2012 | Johansson ........ H04W 24/10 455/67.11 |
| 2012/0106370 A1* | 5/2012 | Radulescu ....... H04W 36/0083 370/252 |
| 2013/0034013 A1* | 2/2013 | Jung .................. H04W 24/08 370/252 |
| 2014/0016566 A1 | 1/2014 | Wu ........................ 370/328 |

FOREIGN PATENT DOCUMENTS

| | | |
|---|---|---|
| CN | 101420711 A | 4/2009 |
| EP | 2 437 540 A1 * | 4/2012 |
| EP | 2579641 A2 | 4/2013 |
| JP | 22012005123 A | 1/2012 |
| RU | 2364046 C2 | 8/2009 |
| WO | WO-98/57512 A1 | 12/1998 |

OTHER PUBLICATIONS

3GPP TS 37.320 v0.4.1 (May 2010); 3rd Generation Partnership Project; Technical Specification Group TSG RAN Universal Terrestrial Radio Access (E-UTRA) and Evolved Universal Terrestrial Radio Access (E-UTRA); Radio measurement collection for Minimization of Drive Tests (MDT); Overall description; Stage 2 (Release 10).
R2-100239; Orange, et al.; "MDT Measurement Model"; 3GPP TSG-RAN WG2 Meeting #68bis; Valencia, Spain, Jan. 18-22, 2010.
R2-100245; Nokia Corporation, et al.; "MDT architecture for idle mode reporting"; 3GPP TSG-RAN WG2 Meeting #69; San Francisco, United States Feb. 22-26, 2010.
Tdoc R2-103086, 3GPP TSG-RAN WG2 #70, Montreal, Canada, May 10-14, 2010, "Further details on logged MDT measurement reporting", Ericsson, ST-Ericsson, 6 pgs.
Nokia Siemens Networks; "Minimization of drive tests for E-UTRAN and UTRAN"; Status Report to TSG; RP-100457; TSG RAN meeting #48; Seoul, South Korea; Jun. 1-4, 2010; whole document (5 pages).
LG Electronics Inc.; "Discussion on logged MDT reconfiguration"; R2-102942; 3GPP TSG-RAN WG2 #70; Montreal, Canada; May 10-14, 2010; whole document (4 pages).
Kyocera; "Logged MDT reporting Indication"; R2-103173; 3GPP TSG-RAN WG2 #70; Montreal, Canada; May 10-14, 2010; whole document (2 pages).
CATT; "Handling of the Log Available Indication"; R2-102793; 3GPP TSG RAN WG2 Meeting #70; Montreal, Canada; May 10-14, 2010; whole document (2 pages).
Samsung: "Configuration handling for logged MDT"; R2-102783; 3GPP TSG RAN WG2 #70, May 10-14, 2010, Montreal, Canada; pp. 1-3; 3rd Generation Partnership Project (3GPP); Mobile Competence Centre; 650, Route des Lucioles; F-06921 Sophia-Antipolis Cedex; France.
Ericsson: "Triggers for logged MDT measurement reporting"; Tdoc R2-101426; 3GPP TSG-RAN WG2 #69, Feb. 22-26, 2010, San Francisco, USA; pp. 1-3; 3rd Generation Partnership Project (3GPP); Mobile Competence Centre; 650, Route des Lucioles; F-06921 Sophia-Antipolis Cedex; France.
NTT Docomo Inc.: "Log availability indication condition and configuration state"; R2-102905; 3GPP TSG-RAN2#70, May 10-14, 2010, Montreal, Canada; pp. 1-5; 3rd Generation Partnership Project (3GPP); Mobile Competence Centre; 650, Route des Lucioles; F-06921 Sophia-Antipolis Cedex; France.
CATT: "New SRB for MDT Reporting"; R2-102792; 3GPP TSG RAN WG2 Meeting #70, Montreal, Canada, May 10-14, 2010; pp. 1-2; 3rd Generation Partnership Project (3GPP); Mobile Competence Centre; 650, Route des Lucioles; F-06921 Sophia-Antipolis Cedex; France.

* cited by examiner

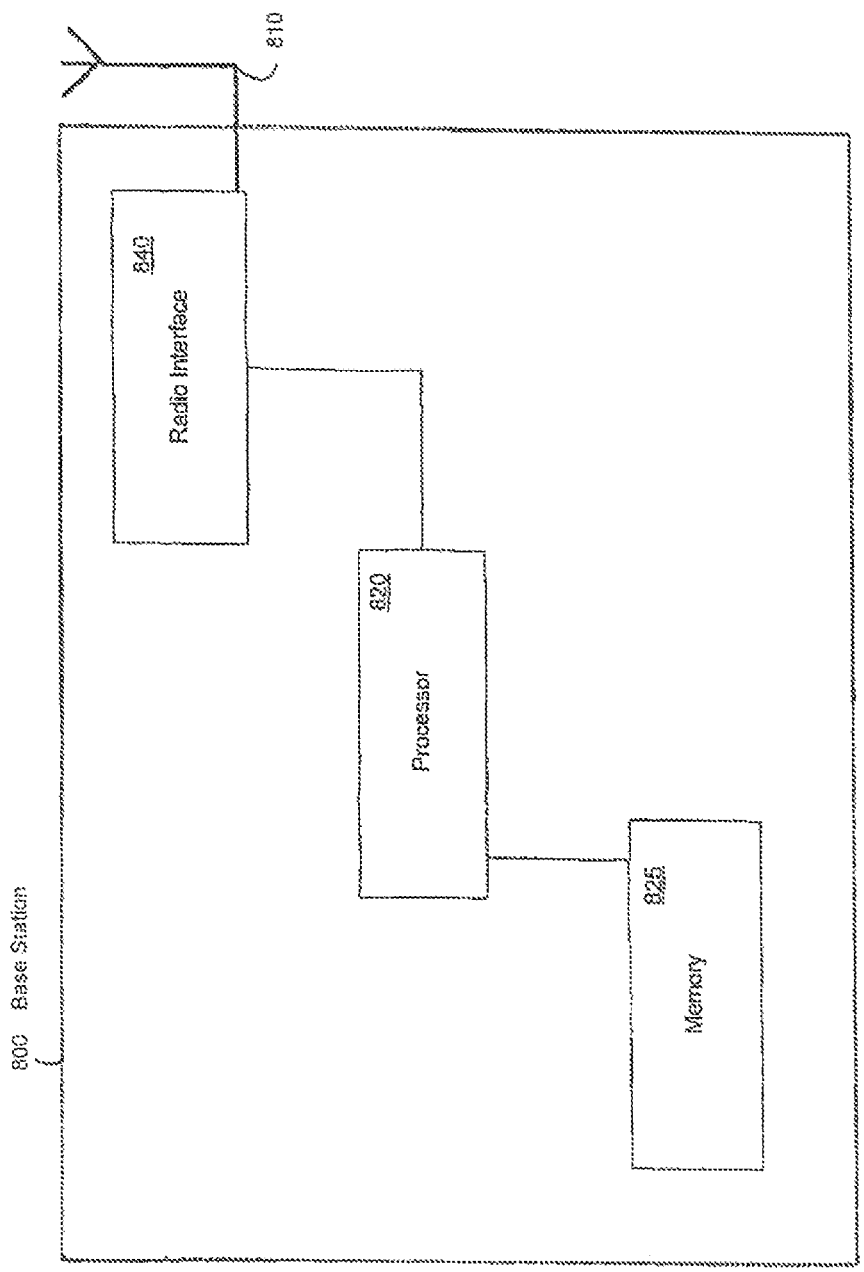

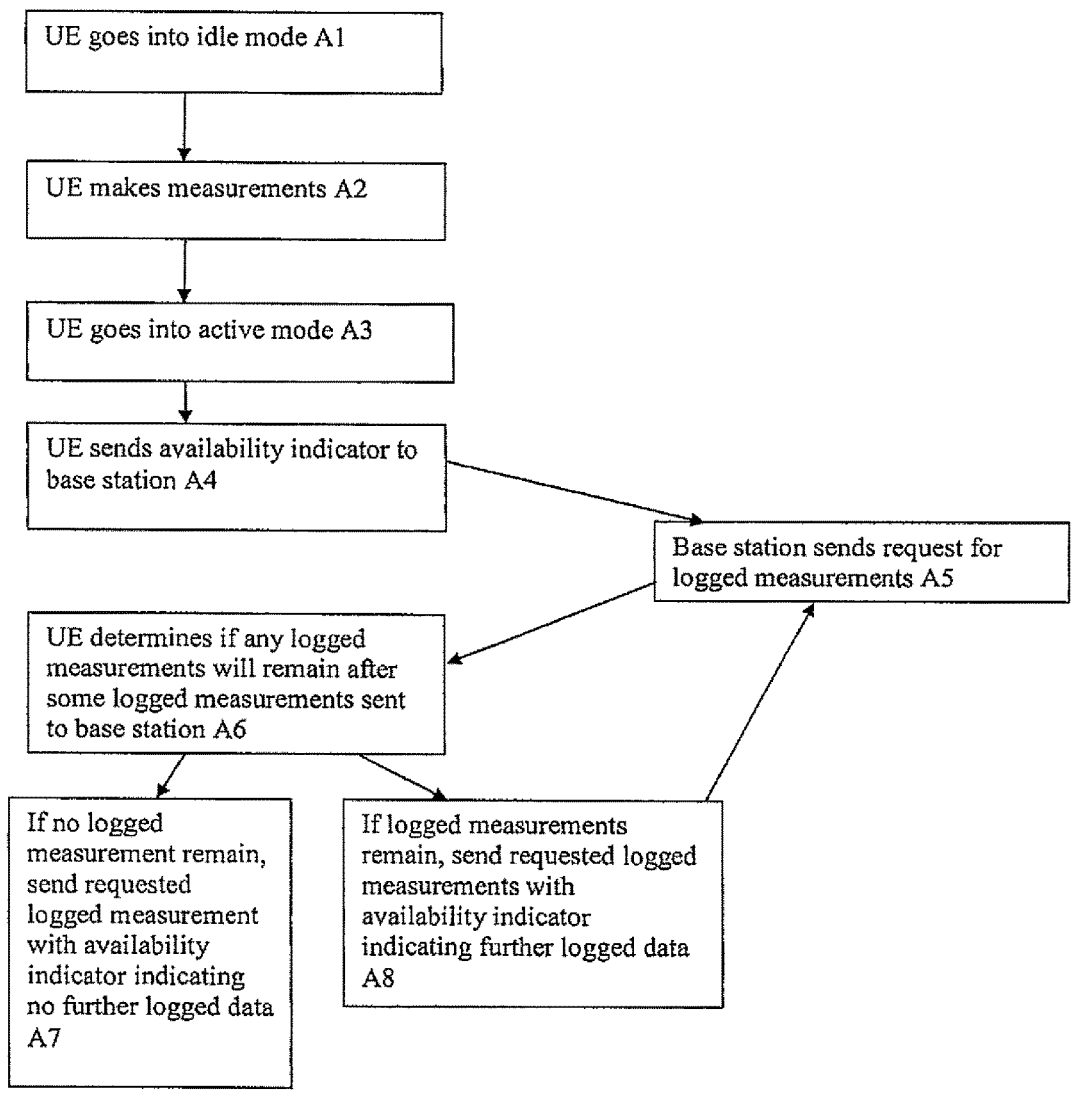

METHODS AND APPARATUS FOR MDT LOG REPORTING IN A MOBILE COMMUNICATION NETWORK

BACKGROUND OF THE INVENTION

(1) Field of the Invention

Some embodiments of the present invention relate to methods and apparatus and in particular but not exclusively to methods and apparatus for the reporting of measurement information.

(2) Description of Related Art

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. For example, it can be defined if carrier aggregation is used. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator. A further development of the LTE is referred to as LTE-Advanced (LTE-A). The LTE-Advanced aims to provide further enhanced services by means of even higher data rates and lower latency with reduced cost.

BRIEF SUMMARY OF THE INVENTION

According to an embodiment, there is provided a method comprising causing a plurality of measurements to be performed by a user equipment to provide measurement information; causing a message to be sent from the user equipment to a network element indicating that measurement information is available; and responsive to a message from said network element requesting said measurement information, causing a response to be sent from the user equipment to said network element with only some of said measurement information and information indicating that further measurement information is available.

According to another embodiment, there is provided a method comprising receiving a message from a user equipment at a network element indicating that measurement information is available; responsive to said message, sending a request for at least some measurement information; and receiving a further message from said user equipment with only some of said measurement information and information indicating that further measurement information is available.

According to a further embodiment, there is provided an apparatus comprising at least one processor and at least one memory comprising computer program code, the at least one memory and the computer program code configured, with the at least one processor to cause the apparatus to: cause a plurality of measurements to be performed by a user equipment to provide measurement information; cause a message to be sent from the user equipment to a network element indicating that measurement information is available; and responsive to a message from said network element requesting said measurement information, cause a response to be sent from the user equipment to said network element with only some of said measurement information and information indicating that further measurement information is available.

According to a further embodiment, there is provided an apparatus comprising at least one processor and at least one memory comprising computer program code, the at least one memory and the computer program code configured, with the at least one processor to cause the apparatus to: receive a message from a user equipment at a network element indicating that measurement information is available; responsive to said message, send a request for at least some measurement information; and receive a further message from said user equipment with only some of said measurement information and information indicating that further measurement information is available.

According to another embodiment, there is provided an apparatus comprising means for receiving a message from a user equipment at a network element indicating that measurement information is available; responsive to said message, means for sending a request for at least some measurement information; and means for receiving a further message from said user equipment with only some of said measurement information and information indicating that further measurement information is available.

According to another embodiment, there is provided an apparatus comprising means for causing a plurality of measurements to be performed by a user equipment to provide measurement information; means for causing a message to be sent from the user equipment to a network element indicating that measurement information is available; and means, responsive to a message from said network element requesting said measurement information, for causing a response to be sent from the user equipment to said network element with only some of said measurement information and information indicating that further measurement information is available.

BRIEF DESCRIPTION OF THE SEVERAL VIEWS OF THE DRAWINGS

Some embodiments will now be described, by way of example only, with reference to the following examples and accompanying drawings in which:

FIG. 5 schematically shows a base station; and

FIG. 6 shows a flow diagram of a method embodying the present invention.

DETAILED DESCRIPTION OF THE INVENTION

In the following description certain exemplifying embodiments are explained with reference to wireless or mobile communication systems serving mobile communication devices. A wireless communication system and mobile communication device are briefly explained with reference to FIGS. 1 and 2.

A communication device can be used for accessing various services and/or applications provided via a communication system. In wireless or mobile communication systems the access is provided via a wireless access interface between mobile communication devices 1 and an appropriate access system 10. A mobile device 1 can typically access wirelessly a communication system via an access node such as at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

Figure 1:
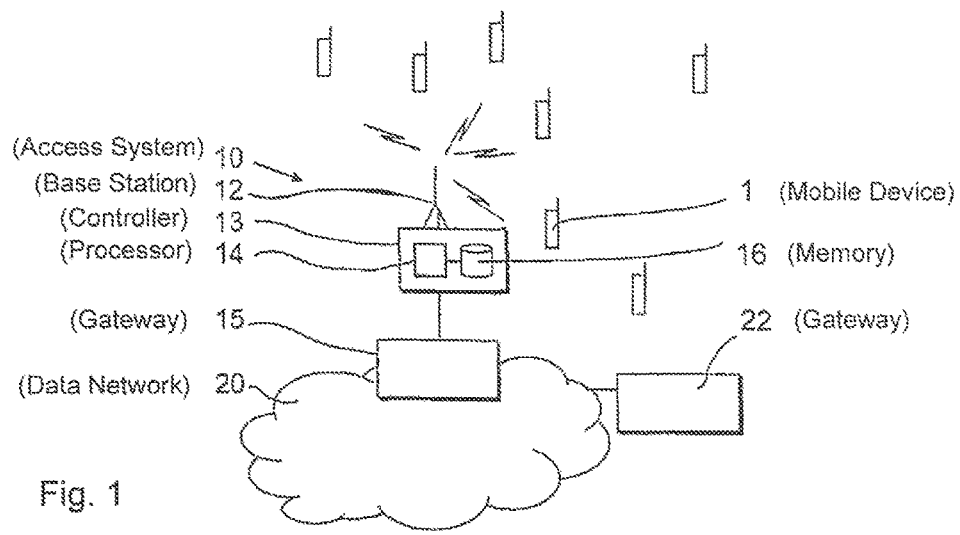
FIG. 1 shows an example of a communication system in which some embodiments of the present invention may be implemented.

A base station is typically controlled by at least one appropriate controller so as to enable operation thereof and management of mobile communication devices in communication with the base station. The control entity can be interconnected with other control entities. In FIG. 1 the controller is shown to be provided by block 13. An appropriate controller apparatus may comprise at least one memory 16, at least one data processing unit 14 and an input/output interface. The controller 13 may be provided with memory capacity and at least one data processor 14. It shall be understood that the control functions may be distributed between a plurality of controller units. The controller apparatus for a base station may be configured to execute an appropriate software code to provide the control functions as explained below in more detail.

In the example shown in FIG. 1, the base station node 12 is connected to a data network 20 via an appropriate gateway 15. A gateway function between the access system and another network such as a packet data network may be provided by means of any appropriate gateway node 22, for example a packet data gateway and/or an access gateway. A communication system may thus be provided by one or more interconnect networks and the elements thereof, and one or more gateway nodes may be provided for interconnecting various networks. In some embodiments the base station node is an eNodeB.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
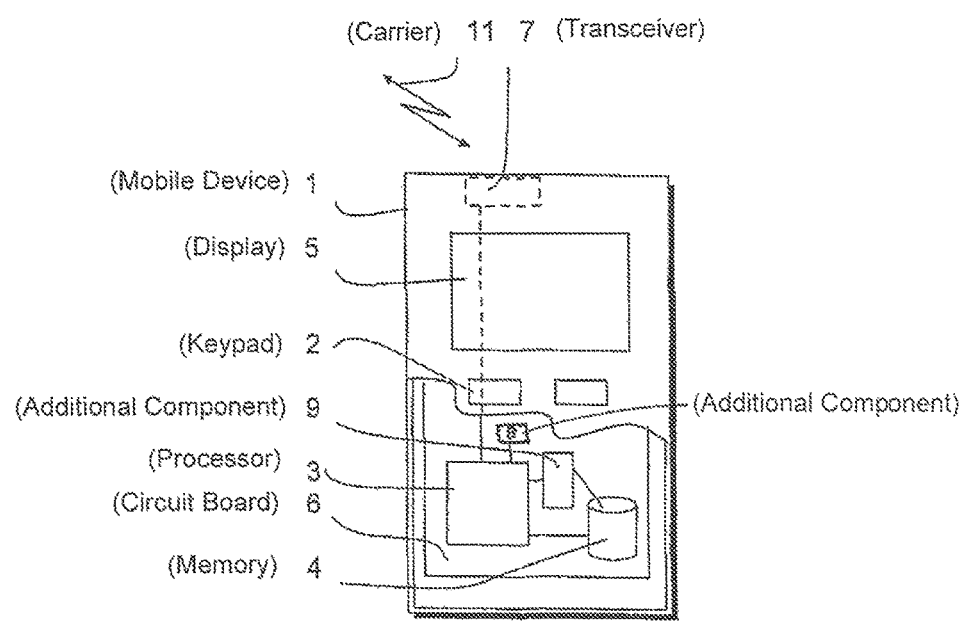
FIG. 2 shows an example of a communication device.

FIG. 2 shows a schematic, partially sectioned view of a communication device 1 that can be used for communication on carrier 11 with at least one other wireless station. An appropriate mobile communication device may be provided by any device capable of sending and receiving radio signals. Such a communication device may be referred to as a user equipment UE. Non-limiting examples include a mobile station (MS) such as a mobile phone or smart phone, a portable computer provided with a wireless interface card or other wireless interface facility, personal data assistant (PDA) provided with wireless communication capabilities, or any combinations of these or the like. The communication device or UE may in some embodiments be stationary and generally fixed in position.

A mobile communication device may be used for voice and video calls, for accessing service applications provided via a data network. The mobile device 1 may receive signals via appropriate apparatus for receiving and transmitting radio signals on wireless carriers, or radio bearers. In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 8, 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Some embodiments of the present invention may be implemented in an LTE system, for example the LTE-A system. Of course other embodiments of the present invention may be used with other releases of the LTE standard. Yet further embodiments of the present invention may be used with the standards other than the LTE standard.

Minimizing drive tests (MDT) has been proposed in 3GPP RAN Working Groups. In some embodiments of the invention, automatic collection of UE measurements may be defined. In some embodiments of the invention, this may enable easier monitoring of network performance and may replace expensive drive-tests performed by operators manually. This functionality requires relevant input from the terminal or UE.

Currently, in 3GPP two MDT reporting approaches have been agreed and accepted. One approach is Immediate MDT reporting. Immediate MDT reporting means that a UE needs to report MDT measurements immediately to abase station right after MDT measurement has been made.

Another approach is Logged MDT reporting. In Logged MDT reporting, a UE in an idle mode will make some MDT measurement results, and the UE will report these measurements to the network when the UE connects again to the network. The idle mode occurs when the UE is switched on and not actively connected to the network. An active connection occurs, for example, when the UE is on a call or has an active data connection to, for example, the Internet.

The measurements made by the UE when in the idle mode relate to the serving cell and/or neighboring cells. These measurements may be of any suitable parameter such as signal strength of the respective cell as received at the UE. The signal strength of a reference signal, for example a pilot signal, may be measured. Alternatively or additionally interference information may be determined by the UE. The UE may be arranged to provide one or more types of measurement information for one or more cells.

The logging MDT may have one or more of the following defined: Threshold—this defines one or more thresholds above or below which measurements are performed. For example the UE may be controlled only to make logging measurements of neighboring cells when the signal strength of the serving cell falls below a given threshold value.

Trigger quantity—this may be for event related measurements. For example this will define one or more measures needed to be used to evaluate a triggering condition for the event. The quantities will trigger the UE to start or stop making logging measurements. This may be associated with the serving cell and/or one or more neighboring cells radio environment measurements, such as CPICH (common pilot channel) RSCP (received signal code power), CPICH Ec/No (ratio of energy to noise), or TDD (Time division duplex) P-CCPCH (Primary Common Control Physical Channel) RSCP and ISCP (Interference signal code power), RSRP (reference signal received power) and RSRQ (reference signal received quality).

Report quantity—this may be associated with the trigger quantity. For example this will be measurement results, which fulfilled the triggering condition.

Report amount—this may be the number of measurements made or may be the maximum amount of logged data. It may be that different measurements result in a differing amount of logged data.

Measurement interval—this may be the frequency at which periodic measurements are made.

Measurement area—this may define the size of the area for which measurements may be made. In one embodiment this may instead be defined by a minimum signal strength.

One or more of the above may be controlled by at least one of the network and the UE. The values of one or more of the above may be changed by the network. This may be done during an active connection and may be done via RRC messaging.

When the UE becomes active, after being in the idle mode, the UE indicates the availability of stored logged MDT reports to the network. When the network gets this information, the network will initiate the UE to report logged MDT reports to network. In one embodiment an availability indication is provided to indicate that there are stored logged MDT reports. In one embodiment, that availability indication may be implemented with one bit, with one value of the bit (for example "1") indicating the availability of the information and the other value (for example "0") indicating that no information is available.

The UE may send this indication using one or more of the following messages:

1. A connection set up message such as RRCConnectionSetupComplete at RRC (Radio Resource control) connection establishment;

2. A connection re-establishment message such as RRCConnectionReestablishmentComplete at RRC connection re-establishment; and 3. A handover message such as RRCConnectionReconfigurationComplete at UE HO (handover).

When the network receives the availability indicator within one or more of the above messages, the network may decide when to use request and response procedures, such as UEInformationRequest/Response procedures, to retrieve logged MDT reports from the UE.

Figure 3:
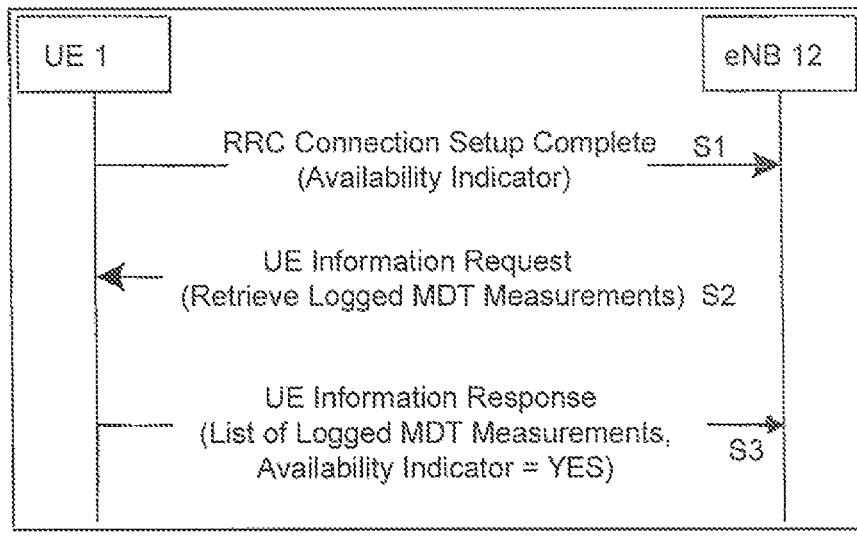
FIG. 3 shows a first signal flow between a UE and a base station embodying the present invention.

The MDT measurement reporting may share the Signaling Radio Bearers SRB2 with one or more other RRC messages. Reference will now be made to FIG. 3 which shows one method of logged MDT measurement reporting embodying the present invention. In step S1, the UE 1 send to the base station 12 a message indicating that the connection set up has been complete. The message will include the availability indicator which indicates that there are logged MDT measurements. In one embodiment, that message may be a RRCConnnectionSetupComplete message.

In step S2, the base station 12 is arranged to send a message to the UE requesting the logged MDT measurements. This message in one embodiment of the invention may be a UEInformationRequest message.

In step S3, the UE is arranged to provide a response with a list of logged MDT measurements. and, in one embodiment, the availability indicator is provided with a value indicating that there are no logged measurements still to retrieve. As will be discussed later, in some alternative embodiments, the availability indication can selectively indicate whether or not there are further logged measurements still to be retrieved.

In some embodiments, the UE can put all its logged MDT measurements into one response message such as a UEInformationResponse message. In some embodiments of the invention, there may be no explicit size limitation of RRC messages. Then, in some embodiments, only one round of logged MDT measurement retrieval is sufficient to obtain the logged MDT measurements.

However, in some embodiments of the invention the number of logged MDT measurements in UE may be too large in some cases, to be practically contained in a single response message. This may occur, for example, where the UE has been in the idle mode for a relative long time and has a relatively large number of measurements. This may alternatively or additionally occur where the UE sends an availability indicator to network indicating logged MDT measurements, but network is very busy. As the network is busy, the network may not initiate logged MDT measurements reporting before the UE goes into the idle mode again. This may alternatively or additionally occur if the UE sends the availability indicator to the network, but the network does not support the MDT feature. Accordingly the network will not initiate logged MDT measurements reporting before UE goes into the idle mode again.

If there are too many logged MDT measurements waiting to be sent to the network, using one response message may not be appropriate, since it will make the response message too big, and/or may block other important RRC messages also carried by the SRB2. If the UE does not send all the logged MDT measurements which the UE has, then the UE may have to wait for the next one of 1) connection setup complete message; 2) connection reestablishment complete message; or 3) connection reconfiguration complete message.

In some scenarios, the UE may go into the idle mode again, before the UE is able to send one of the three messages mentioned previously. In some cases, if UE waits too long for an opportunity to send some of the logged MDT measurements, some of the logged MDT measurements may be out of time and thus not valid. These measurements may have to be deleted.

In some embodiments of the invention, there may be a plurality of rounds of logged MDT measurements reporting. Each round has some of the logged MDT measurements in one response message. The number of logged measurements and/or the size of the response message may be capped or have an upper limit in order to keep the response message within an acceptable size. By way of example only, the response message from the UE may be an UEInformationResponse.

In some embodiments of the present invention, the three messages mentioned previously may be used to send the availability indicator to the network. The three messages are 1) connection setup complete message; 2) connection reestablishment complete message; or 3) connection reconfiguration complete message. Additionally or alternatively the UE may be arranged to use other messages to provide the availability indication to the network. For example, any RRC message between the UE and the network may be used to carry the availability indicator from the UE to the network. The availability indicator may be a single bit indicator as discussed above or may take any other suitable form. For example the availability indicator may have more than one bit and may be arranged to provide more complex information. Alternatively or additionally the availability may be provided by encoded data.

Figure 4:
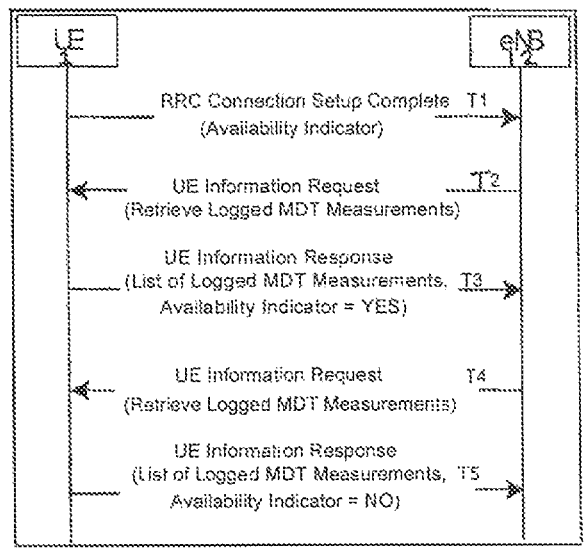
FIG. 4 shows a second signal flow between a UE and a base station embodying the present invention.

In one embodiment, it is proposed to use a UE information response to carry some of the logged MDT measurements and optionally an up-to-date availability indicator to the base station. Reference is made to FIG. 4 which shows the signal flow in a method embodying the present invention. Steps T1 and T2 are the same as steps S1 and S2 and will not be described in more detail. Step T3 is the same as step S3, but this time the availability indicator indicates that the there are further logged MDT reports which have yet to be sent.

In step T4, the base station requests further logged MDT measurement information from the UE.

In step T5, the UE sends the remainder of the logged MDT measurements and the availability indicator is set to indicate that no further MDT reports are available.

It should be appreciated that in alternative embodiments, more than two messages may be sent from the UE to the network in some embodiments of the invention.

In one alternative embodiments of the invention, the base station may send a single request for the logged MDT information, with the UE sending the response with all the MDT information in two or more messages.

In some embodiments of the invention, the availability indication can be provided by the UE along with some further information.

In some embodiments of the invention the further information may be provided by the UE without the availability indication. The availability information may be in the latter case be implicitly provided by the further information. The further information may comprise one or more of the following:

1. Information indicating the size of the remaining information in the log of the UE. This is the part of the log which has yet to be transmitted to the network.

2. Information of the number of chunks or messages which the UE will use to transmit the whole log.

The base station may in its request for the logged MDT information provide an indication as to the maximum size of logged MDT data or size of message incorporating the logged MDT data. The information may be provided in alternative embodiments in messages other than the request for logged MDT reports. The quantity information from the base station may be in any other suitable form in alternative embodiments of the invention.

Thus in preferred embodiments of the invention, the UE measurement logs may be split. The measurement logs may be split when the amount of data exceeds a threshold or where the message size will exceed a given threshold. This may avoid difficulties associated with always including the measurement logs in a single RRC message. Of course if the measurement log is small enough, the measurement log may be included in a single message. This may mean that the shared capacity among all messages utilizing the SRB2 is better controlled.

Reference is made to FIG. 6 which shows a flow diagram of a method embodying the present invention.

In the first step A1, the UE enters the idle mode. The UE may enter an idle mode after being switched on or may enter the idle mode after an active connection has been terminated leaving no open active connections.

In the second step A2, the UE performs the MDT measurements, as discussed previously.

In the third step A3, the UE enters the active mode. This may be initiated by the base station or the UE.

In the fourth step A4, the UE sends the availability indicator to the base station. This may be in any of the messages discussed previously. The availability indicator may take any of the forms discussed previously.

In the fifth step A5, the base station sends a request for the logged measurement data. This can be in any of the messages discussed previously.

In the sixth step A6, the UE determines if there will be any remaining logged MDT measurements after a response has been sent to the request from the base station.

The next step will be step A7, if the UE determines that there will be no remaining logged MDT measurements. In this step, all the logged measurements will be sent to the base station along with the availability indicator which will indicate that there are no logged MDT measurements remaining.

The next step will be step A8, if the UE determines that there are some remaining logged MDT measurements, some of the logged MDT measurements are sent to the base station along with the availability indicator which will indicate that there are still logged MDT measurements.

Step A8 will be followed by steps A5 and then A6. Step A6 will be followed by step A7 or A8 and so on.

FIG. 5 depicts an exemplary apparatus 800 for use in a base station. The apparatus may be connected to an antenna 810 for receiving via a downlink and transmitting via an uplink. The apparatus also includes a radio interface 840, which may comprise one of or more of the following components such as filters, converters (e.g., digital-to-analog converters and the like), symbol demappers, an Inverse Fast Fourier Transform (IFFT) module, and the like, to process symbols, such as OFDMA symbols, carried by a downlink or an uplink. The apparatus further includes a processor 820 for controlling the base station and for accessing and executing program code stored in memory 825. It should be appreciated that the processor 820 can comprises one or more processors in practice and the memory 825 may be arranged to comprise one or more memories in practice.

The apparatus of the base station may be configured to receive the messages sent by the UE. One or more of the steps performed by the apparatus of the base station may be performed when one or more associated instructions are run on one or more of the processors. It should be appreciated that the one or more associated instructions may be stored in one or more memories of the base station.

The embodiments described above have had the MDT measurements taking place in the idle mode. Alternatively or additionally, the measurements may made at other times, for example where the UE is connected or in an active mode. In this alternative, reporting would take place in a similar manner, as described previously Whilst embodiments of the present invention have been described in relation to the LTE systems, it should be appreciated that embodiments of the present invention can be used in conjunction with any other suitable standard. For example, embodiments of the invention may be used in a UMTS environment. In this alternative, the messages may be UMTS messages.

It is noted that whilst embodiments may have been described in relation to user equipment or mobile devices such as mobile terminals, embodiments of the present invention may be applicable to any other suitable type of apparatus suitable for communication via access systems. A mobile device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. The data processing entities may be controlled by one or more computer programs which may be stored in one or more memories of the apparatus.

Alternatively or additionally appropriately adapted computer program code product may be used for implementing the embodiments, when loaded to a computer or a processor. The program code product for providing the operation may be stored on and provided by means of a carrier medium such as a carrier disc, card or tape. In some embodiments, there may be the possibility to download the program code product via a data network.

Some embodiments of the invention may be implemented as a chipset, in other words a series of integrated circuits communicating among each other. The chipset may comprise microprocessors arranged to run code, application specific integrated circuits (ASICs), and/or programmable digital signal processors for performing the operations described above.

Embodiments of the inventions may be practiced in various components such as integrated circuit modules.

The design of integrated circuits may be by a highly automated process. Complex and powerful software tools may be available for converting a logic level design into a semiconductor circuit design ready to be etched and formed on a semiconductor substrate. Programs, such as those provided by Synopsys, Inc. of Mountain View, Calif. and Cadence Design, of San Jose, Calif. may automatically route conductors and locate components on a semiconductor chip using well established rules of design as well as libraries of pre-stored design modules. Once the design for a semiconductor circuit may have been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for a user equipment in a telecommunications network, the method comprising:
   entering an idle mode, wherein the user equipment is not in active communication with the telecommunications network;
   while in the idle mode, performing a plurality of MDT (minimization of drive tests) measurements;
   logging at least some of said plurality of MDT measurements into a memory of the user equipment to provide logged MDT measurement information, said at least some of said plurality of MDT measurements satisfying a predetermined logging criterion;
   entering an active mode, wherein the user equipment is in active communication with the telecommunications network;
   sending a message to a network element, said message including an availability indicator, said availability indicator indicating that logged MDT measurement information is available;
   receiving a reply message from said network element requesting said logged MDT measurement information; and sending a response to said network element with at least a portion of said logged MDT measurement information, said response further including said availability indicator indicating that more of said logged MDT measurement information is available.

2. The method as claimed in claim 1, further comprising: when said response includes said availability indicator, sending at least one further message to said network element with more of said logged MDT measurement information.

3. The method as claimed in claim 2, wherein sending at least one further message is repeated until all of said logged MDT measurement information has been sent to said network element.

4. The method as claimed in claim 2, wherein said at least one further message includes said availability indicator indicating that more of said logged MDT measurement information is available.

5. The method as claimed in claim 2, wherein sending at least one further message is responsive to a request from said network element for more of said logged MDT measurement information.

6. The method as claimed in claim 1, further comprising: sending quantity information to said network element, said quantity information indicating at least one of:
an additional amount of said logged MDT measurement information available, and
a number of messages to said network element over which said logged MDT measurement information is ready to be sent.

7. The method as claimed in claim 6, wherein said quantity information is sent with said availability indicator indicating that more of said logged MDT measurement information is available.

8. The method as claimed in claim 1, wherein at least one reply message from said network element includes quantity information, said quantity information indicating at least one of a maximum size of said logged MDT information measurement information to be sent, and a size of a reply message incorporating said logged MDT measurement information, and wherein at least one response is sent in accordance with said quantity information.

9. A computer program product comprising a non-transitory computer-readable storage medium bearing computer program code embodied therein for use with a computer, the computer program code comprising code for performing the method of claim 1.

10. A method for a network element in a telecommunications network for monitoring network performance, the method comprising:
receiving a message from a user equipment, said message including an availability indicator, said availability indicator indicating that logged MDT (minimization of drive tests) measurement information is available, said logged MDT information being at least some of a plurality of MDT measurements performed by the user equipment, said at least some of said plurality of MDT measurements satisfying a predetermined criterion;
responsive to said message, sending a request to said user equipment for said logged MDT measurement information;
receiving a response from said user equipment with at least a portion of said logged MDT measurement information, said response further including said availability indicator indicating that more of said logged MDT measurement information is available;
when said availability indicator indicates that more of said logged MDT information is available, sending a further request to said user equipment for said more of said logged MDT measurement information; and
receiving a further response from said user equipment with said more of said logged MDT measurement information.

11. An apparatus, said apparatus being a user equipment in a telecommunications network, comprising:
at least one processor; and
at least one memory including computer program code, the at least one memory and the computer program code configured, with the at least one processor, to cause the apparatus to:
enter an idle mode, wherein the user equipment is not in active communication with the telecommunications network;
while in the idle mode, perform a plurality of MDT (minimization of drive tests) measurements;
log at least some of said plurality of MDT measurements into said at least one memory to provide logged MDT measurement information, said at least some of said plurality of MDT measurements satisfying a predetermined logging criterion;
enter an active mode, wherein the user equipment is in active communication with the telecommunications network;
send a message to a network element, said message including an availability indicator, said availability indicator indicating that logged MDT measurement information is available;
receive a reply message from said network element requesting said logged MDT measurement information; and
send a response to said network element with a portion of said logged MDT measurement information, said response further including said availability indicator indicating that more of said logged MDT measurement information is available.

12. The apparatus as claimed in claim 11, wherein the at least one memory and the computer program code are further configured, with the at least one processor, to send at least one further message to said network element with more of said logged MDT measurement information, when said response includes said availability indicator.

13. The apparatus as claimed in claim 12, wherein the at least one memory and the computer program code are further configured, with the at least one processor, to repeat sending at least one further message until all of said logged MDT measurement information has been sent to said network element.

14. The apparatus as claimed in claim 12, wherein said at least one further message includes said availability indicator indicating that more of said said logged MDT measurement information is available.

15. The apparatus as claimed in claim 12, wherein sending at least one further message is responsive to a request from said network element for more of said logged MDT measurement information.

16. The apparatus as claimed in claim 11, wherein the at least one memory and the computer program code are further configured, with the at least one processor, to send quantity information to said network element, said quantity information indicating at least one of:
an additional amount of said logged MDT measurement information available, and a number of messages to said network element over which said logged MDT measurement information is ready to be sent.

17. The apparatus as claimed in claim 16, wherein said quantity information is sent with said availability indicator indicating that more of said logged MDT measurement information is available.

18. The apparatus as claimed in claim 11, wherein at least one reply message from said network element includes quantity information, said quantity information indicating at least one of a maximum size of said logged MDT information measurement information to be sent, and a size of a reply message incorporating said logged MDT measurement information, and wherein at least one response is sent in accordance with said quantity information.

19. The apparatus as claimed in claim 11, wherein at least one message is a radio resource control message.

20. A user equipment comprising the apparatus as claimed in claim 11.

21. An apparatus, said apparatus being a network element in a telecommunications network, comprising:
   at least one processor; and
   at least one memory including computer program code, the at least one memory and the computer program code configured, with the at least one processor, to cause the apparatus to:
   receive a message from a user equipment, said message including an availability indicator, said availability indicator indicating that logged MDT (minimization of drive tests) measurement information is available, said logged MDT information being at least some of a plurality of MDT measurements performed by a user equipment, said at least some of said plurality of MDT measurements satisfying a predetermined criterion;
   responsive to said message, send a request to said user equipment for said logged MDT measurement information;
   receive a response from said user equipment with at least a portion of said logged MDT measurement information, said response further including said availability indicator indicating that more of said logged MDT measurement information is available;
   when said availability indicator indicates that more of said logged MDT information is available, send a further request to said user equipment for said more of said logged MDT measurement information; and
   receive a further response from said user equipment with said more of said logged MDT measurement information,
   wherein the apparatus is a network element obtaining MDT measurement information to monitor network performance.

22. A base station comprising the apparatus as claimed in claim 21.

* * * * *

UNITED STATES PATENT AND TRADEMARK OFFICE
CERTIFICATE OF CORRECTION

PATENT NO. : 10,521,487 B2
APPLICATION NO. : 13/805366
DATED : December 31, 2019
INVENTOR(S) : Wei Hua Zhou, Yi Zhang and Malgorzata Tomala Page 1 of 1

It is certified that error appears in the above-identified patent and that said Letters Patent is hereby corrected as shown below:

In the Claims

Claim 14, Column 12, Line 55, delete "said" before the word logged.

Signed and Sealed this
Twenty-eighth Day of April, 2020

Andrei Iancu
*Director of the United States Patent and Trademark Office*